(12) United States Patent
Heo et al.

(10) Patent No.: US 11,189,849 B1
(45) Date of Patent: Nov. 30, 2021

(54) FUEL CELL

(71) Applicants: Hyundai Motor Company, Seoul (KR); Kia Motors Corporation, Seoul (KR)

(72) Inventors: Yong Suk Heo, Seoul (KR); Jae Min Ahn, Daejeon (KR); Suk Min Baeck, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/072,344

(22) Filed: Oct. 16, 2020

(30) Foreign Application Priority Data

Jul. 31, 2020 (KR) .......................... 10-2020-0096106

(51) Int. Cl.
*H01M 8/0438* (2016.01)
*H01M 8/2465* (2016.01)

(52) U.S. Cl.
CPC ..... *H01M 8/04417* (2013.01); *H01M 8/2465* (2013.01)

(58) Field of Classification Search
CPC .................. H01M 8/04417; H01M 8/2465
See application file for complete search history.

(56) References Cited

U.S. PATENT DOCUMENTS

| 2008/0113250 A1* | 5/2008 | Joos | H01M 8/0271 |
| | | | 429/458 |
| 2009/0053570 A1* | 2/2009 | Tian | H01M 8/248 |
| | | | 429/414 |
| 2013/0202979 A1 | 8/2013 | Katano et al. | |
| 2014/0234744 A1* | 8/2014 | Nielsen | H01M 8/2475 |
| | | | 429/457 |

FOREIGN PATENT DOCUMENTS

| JP | 5615363 B2 | 10/2014 |
| JP | 5941791 B2 | 6/2016 |

* cited by examiner

*Primary Examiner* — Stewart A Fraser
(74) *Attorney, Agent, or Firm* — Slater Matsil, LLP (57) ABSTRACT

A fuel cell includes a cell stack configured such that a plurality of unit cells is stacked, an end plate disposed at one of two ends of the cell stack, the end plate including an air inlet, an air outlet, and a groove portion including a first groove adjacent to and spaced apart from the air outlet and a second groove connecting the first groove to the air inlet, and a cover configured to cover a region of the end plate in which the air inlet, the groove portion and the air outlet are formed so as to form a flow path together with the second groove to allow air to pass therethrough. The cover includes a first through-hole communicating with the first groove, a second through-hole communicating with the air outlet, and a partition wall isolating the first and second through-holes from each other.

19 Claims, 11 Drawing Sheets

FUEL CELL

CROSS-REFERENCE TO RELATED APPLICATIONS

This application claims the benefit of Korean Patent Application No. 10-2020-0096106, filed on Jul. 31, 2020, which application is hereby incorporated herein by reference.

TECHNICAL FIELD

Embodiments relate to a fuel cell.

BACKGROUND

In general, a fuel cell generates electric power using hydrogen and oxygen. To this end, a fuel cell includes a cell stack and end plates disposed at both ends of the cell stack. A manifold for supplying hydrogen and air may be disposed at one of the two end plates, and a manifold for supplying coolant may be disposed at the other one of the two end plates. These days, various research on structures for supplying or discharging air to or from a fuel cell is being conducted.

SUMMARY

Accordingly, embodiments are directed to a fuel cell that substantially obviates one or more problems due to limitations and disadvantages of the related art.

Embodiments may provide a fuel cell having a simple structure and a reduced number of components.

However, objects to be accomplished by the embodiments are not limited to the above-mentioned objects, and other objects not mentioned herein will be clearly understood by those skilled in the art from the following description.

A fuel cell according to an embodiment may include a cell stack configured such that a plurality of unit cells is stacked, an end plate disposed at one of two ends of the cell stack and including an air inlet, an air outlet, and a groove portion including a first groove adjacent to and spaced apart from the air outlet and a second groove connecting the first groove to the air inlet, and a cover covering a region of the end plate in which the air inlet, the groove portion and the air outlet are formed so as to form a flow path together with the second groove to allow air to pass therethrough. The cover may include a first through-hole communicating with the first groove, a second through-hole communicating with the air outlet, and a partition wall isolating the first through-hole and the second through-hole from each other.

For example, the fuel cell may further include a valve including an inlet portion connected to the first through-hole and an outlet portion connected to the second through-hole and isolated from the inlet portion. The valve may simultaneously open or simultaneously close the inlet portion and the outlet portion.

For example, the end plate may include a valve area overlapping the valve in a first direction in which the plurality of unit cells is stacked, the first through-hole and the second through-hole may overlap the valve area in the first direction, and the first groove and the air outlet may be located within the valve area.

For example, the first groove may be disposed above the air outlet within the valve area.

For example, the first groove may be disposed beside a point above the air outlet within the valve area.

For example, the fuel cell may further include a first gasket interposed between the end plate and the cover and disposed on edges of the air inlet and the groove portion.

For example, the fuel cell may further include a second gasket interposed between the end plate and the cover and disposed on an edge of the air outlet.

For example, the first gasket and the second gasket may be provided separately from each other, or may be integrally formed with each other.

For example, the flow path may have a predetermined height and a predetermined width. The height may gradually decrease from the first groove to the air inlet, and the width may gradually increase from the first groove to the air inlet.

For example, the second groove may include at least one sub-groove concavely formed between the first groove and the air inlet in the direction in which air flows.

For example, the valve area may be located inside the lower-left corner or the lower-right corner of the end plate, and the air inlet may be located inside the upper-right corner or the upper-left corner of the end plate.

For example, the end plate may include a first protruding portion protruding in the air flow direction from a corner of the first groove that is oriented opposite the air flow direction. The cover may include a second protruding portion protruding in the air flow direction from a corner of the first through-hole that is oriented opposite the air flow direction. The first protruding portion and the second protruding portion may guide air introduced in the first direction such that the direction in which the air travels is changed to the air flow direction.

For example, in the end plate, the corner of the first groove that is oriented opposite the air flow direction may have a chamfered shape.

For example, an end portion of the second groove that is contiguous with the air inlet may have a curvature by which air, having travelled through the flow path in a second direction oriented from the first groove toward the air inlet, is guided so as to travel in the first direction through the air inlet.

For example, the area of the air outlet in the inner surface of the end plate may be greater than the area of the second through-hole in the inner surface of the cover.

For example, the height of the air outlet in the inner surface of the end plate may be greater than the height of the second through-hole in the inner surface of the cover.

For example, the cover may include an upper portion disposed on the second through-hole and a lower portion disposed under the second through-hole. The lower portion of the cover may have an inclined cross-sectional shape such that the height of a portion thereof contiguous with the valve is less than the height of a portion thereof contiguous with the air outlet.

For example, the groove portion of the end plate may be formed of resin.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell 100 according to embodiments will be described with reference to the accompanying drawings. The fuel cell 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. In the following description, the +x-axis direction or the −x-axis direction will be referred to as a "first direction", the direction in which air flows through a flow path will be referred to as a "second direction", the +y-axis direction or the −y-axis direction will be referred to as a "third direction", and the +z-axis direction or the −z-axis direction will be referred to as a "fourth direction". The second direction will be described in detail later.

Figure 1A:
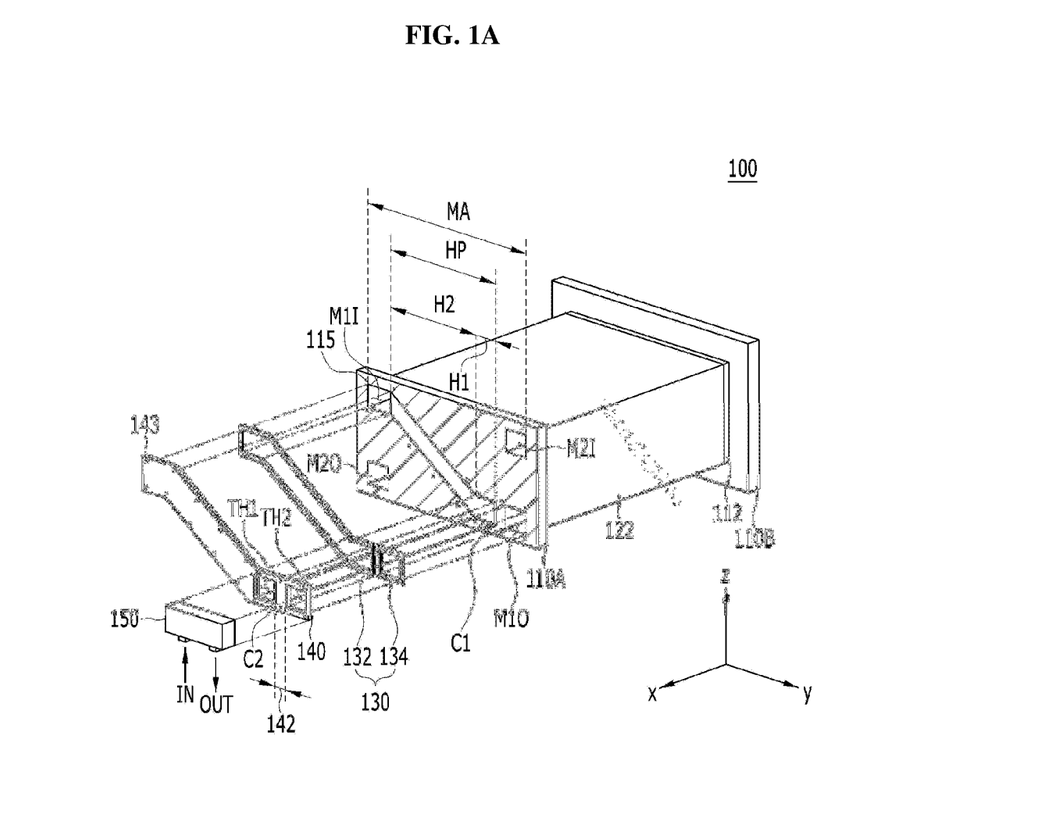
FIG. 1A is an exploded perspective view showing the external appearance of a fuel cell according to an embodiment.
Figure 1B:
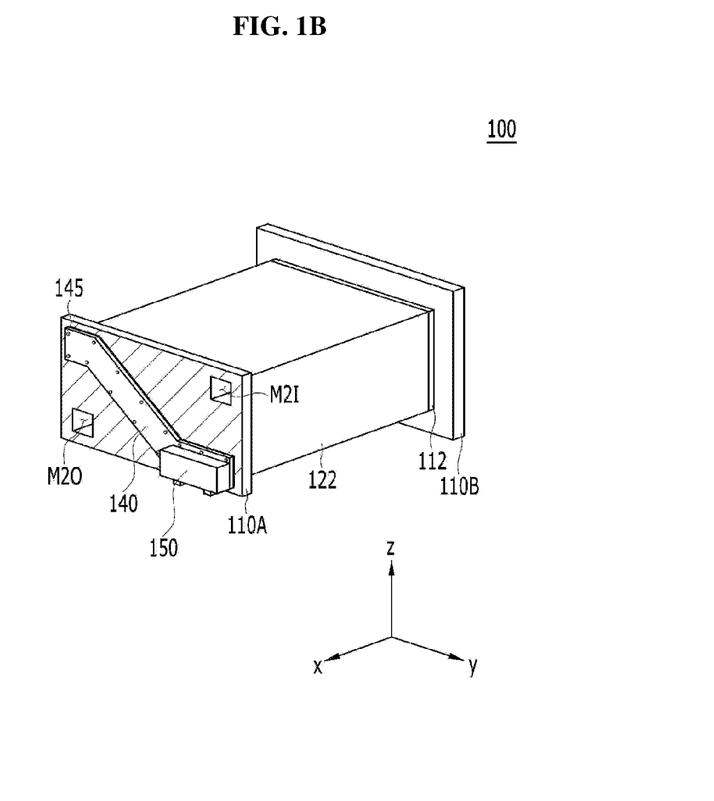
FIG. 1B is a coupled perspective view showing the external appearance of the fuel cell according to the embodiment.

FIG. 1A is an exploded perspective view showing the external appearance of a fuel cell 100 according to an embodiment, and FIG. 1B is a coupled perspective view showing the external appearance of the fuel cell 100 according to the embodiment.

The fuel cell 100 may be, for example, a polymer electrolyte membrane fuel cell (or a proton exchange membrane fuel cell) (PEMFC), which has been studied most extensively as a power source for driving vehicles. However, the embodiment is not limited to any specific form of the fuel cell.

The fuel cell 100 may include end plates (or pressing plates or compression plates) 110A and 110B, current-collecting plates 112, and a cell stack 122.

The cell stack 122 may include a plurality of unit cells stacked on one another in the first direction.

Each of the end plates 110A and 110B may be disposed at a respective one of the two ends of the cell stack 122, and may support and fix the unit cells. That is, the first end plate 110A may be disposed at one end of the cell stack 122, and the second end plate 110B may be disposed at the opposite end of the cell stack 122.

In addition, although not shown, the fuel cell 100 may further include at least one of a clamping member or an enclosure.

The clamping member serves to clamp the unit cells together with the end plates 110A and 110B in the first direction. For example, the clamping member may have a bar shape, a long bolt shape, a belt shape, or a rigid rope shape to clamp the unit cells.

The enclosure may be fastened to the end plates 110A and 110B to serve as a clamping member, or may surround the outer periphery of the cell stack to which the clamping member has been fastened.

Referring to FIG. 1A, the first end plate 110A may include first and second inlet manifolds M1I and M2I and first and second outlet manifolds M1O and M2O, and the second end plate 110B may include a third inlet manifold (not shown) M3I and a third outlet manifold (not shown) M3O.

Figure 2:
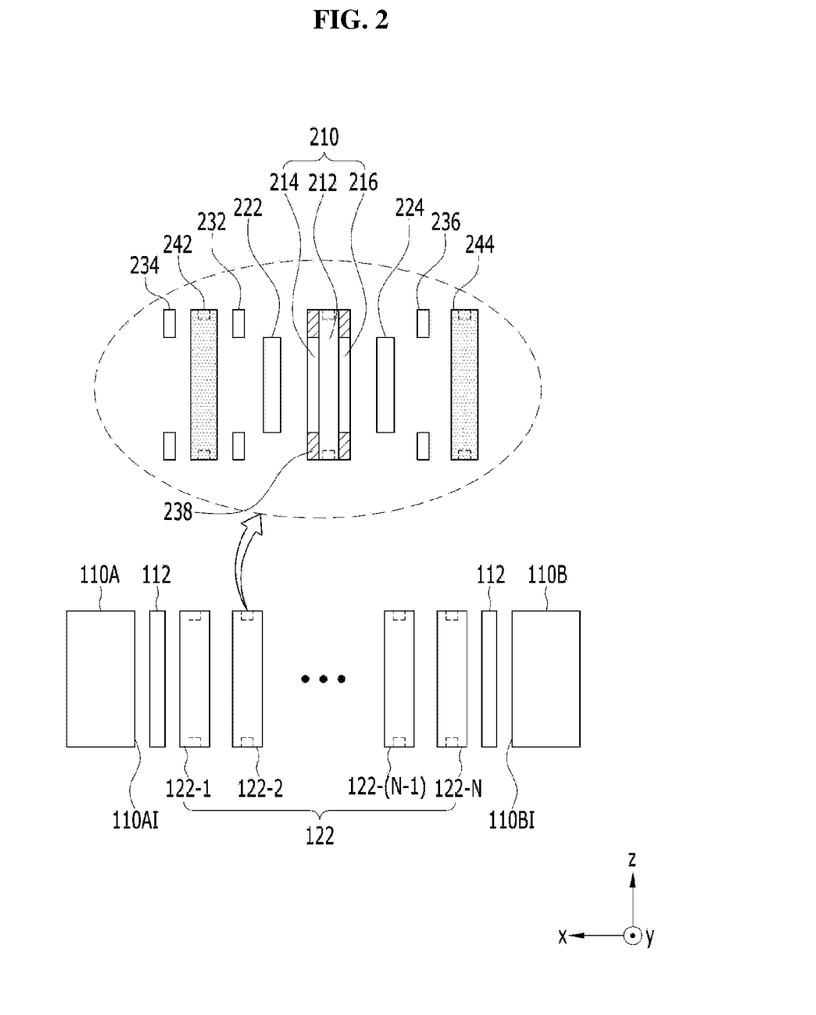
FIG. 2 is a cross-sectional view of end plates, a cell stack, and current-collecting plates in the fuel cell shown in FIGS. 1A and 1B.

FIG. 2 is a cross-sectional view of the end plates 110A and 110B, the cell stack 122, and the current-collecting plates 112 in the fuel cell 100 shown in FIGS. 1A and 1B. For convenience of description, a groove portion formed in the first end plate 110A is not illustrated in FIG. 2, and will be described later.

The end plates 110A and 110B shown in FIG. 2 may respectively correspond to the end plates 110A and 110B shown in FIG. 1A or FIG. 1B, and the cell stack 122 shown in FIG. 2 may correspond to the embodiment of the cell stack 122 shown in FIGS. 1A and 1B. The same components are denoted by the same reference numerals, and a duplicate description thereof will be omitted.

Referring to FIG. 2, the cell stack 122 may include a plurality of unit cells 122-1 to 122-N, which are stacked in the first direction. Here, "N" is a positive integer of 1 or greater, and may range from several tens to several hundreds. "N" may range, for example, from 100 to 300, and may preferably be 220. However, the embodiment is not limited to any specific value of "N".

Each unit cell 122-$n$ may generate 0.6 volts to 1.0 volts of electricity, on average 0.7 volts of electricity. Here, $1 \leq n \leq N$. Thus, "N" may be determined in accordance with the intensity of the electric power to be supplied from the fuel cell 100 to a load. Here, "load" may refer to a part of a vehicle that requires electric power.

Each unit cell 122-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which an electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (or a hydrogen electrode or an anode) 214, and an air electrode (or an oxygen electrode or a cathode) 216. In addition, the membrane electrode assembly 210 may further include a sub-gasket 238.

The polymer electrolyte membrane 212 is disposed between the fuel electrode 214 and the air electrode 216. Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the gas diffusion layers 222 and 224 and the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 100 may generate electric power due to the electrochemical reaction between hydrogen, which is the fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water (hereinafter referred to as "condensate water" or "product water"). The condensate water generated in the air electrode 216 may penetrate the polymer electrolyte membrane 212 and may be transferred to the fuel electrode 214.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive. Each of the first and second gas diffusion layers 222 and 224 may be a microporous layer in which fine carbon fibers are combined. However, the embodiment is not limited to any specific configuration of the first and second gas diffusion layers 222 and 224.

The gaskets 232, 234 and 236 may serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234 and 236, the flatness of the surfaces that are adjacent to the cell stack 122, which generates electric power, may be secured, and thus surface pressure may be distributed uniformly over the reaction surfaces of the cell stack 122.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to the current-collecting plates 112.

The separators 242 and 244 may be respectively disposed outside the gas diffusion layers 222 and 224. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. To this end, the first separator 242 may include an anode plate (AP), in which a channel (i.e. a passage or a flow path) is formed so that hydrogen may flow therethrough.

The second separator 244 serves to supply air as a reactant gas to the air electrode 216 through the second gas diffusion layer 224. To this end, the second separator 244 may include a cathode plate (CP), in which a channel is formed so that air containing oxygen may flow therethrough.

In addition, each of the first and second separators 242 and 244 may form a channel through which a cooling medium (e.g. coolant) may flow.

Further, the separators 242 and 244 may be formed of a graphite-based material, a composite graphite-based material, or a metal-based material. However, the embodiment is not limited to any specific material of the separators 242 and 244.

Each of the first and second separators 242 and 244 may include first to third inlet manifolds M1I, M2I and M3I and first to third outlet manifolds M1O, M2O and M3O.

Hereinafter, for convenience of description, the embodiment will be described such that oxygen, which is a reactant gas, is introduced through the first inlet manifold (hereinafter referred to as an "air inlet") M1I, and such that oxygen, which is a reactant gas, and condensate water are discharged through the first outlet manifold (hereinafter, referred to as an "air outlet") M1O. In this case, hydrogen, which is a reactant gas, may be introduced through the second inlet manifold M2I, and hydrogen, which is a reactant gas, may be discharged through the second outlet manifold M2O. However, the embodiment is not limited thereto.

That is, according to another embodiment, hydrogen, which is a reactant gas, may be introduced through the first inlet manifold M1I, and hydrogen, which is a reactant gas, may be discharged through the first outlet manifold M1O. In this case, oxygen, which is a reactant gas, may be introduced through the second inlet manifold M2I, and oxygen, which is a reactant gas, and condensate water may be discharged through the second outlet manifold M2O. The following description may also be applied to this case.

For example, the first and second end plates 110A and 110B may be formed by combining a plurality of plates, but the embodiment is not limited to any specific configuration of the first and second end plates 110A and 110B.

The current-collecting plates 112 may be disposed between the inner surfaces 110AI and 110BI of the first and second end plates 110A and 110B, which face the cell stack 122, and the cell stack 122. The current-collecting plates 112 serve to collect electrical energy, which is generated by the flow of electrons in the cell stack 122, and to supply the electrical energy to a load of the vehicle that uses the fuel cell 100.

Meanwhile, in order to supply air from the outside to the cell stack 122 or to discharge air from the cell stack 122 to the outside, the fuel cell 100 may further include a gasket 130, a cover 140, and a valve 150.

According to an embodiment, the first end plate 110A may include a groove portion HP formed therein. The groove portion HP may include a first groove H1 and a second groove H2. The first groove H1 may be a groove that is adjacent to and spaced apart from the air outlet M1O, and the second groove H2 may be a groove that connects the first groove H1 to the air inlet M1I.

Figure 3:
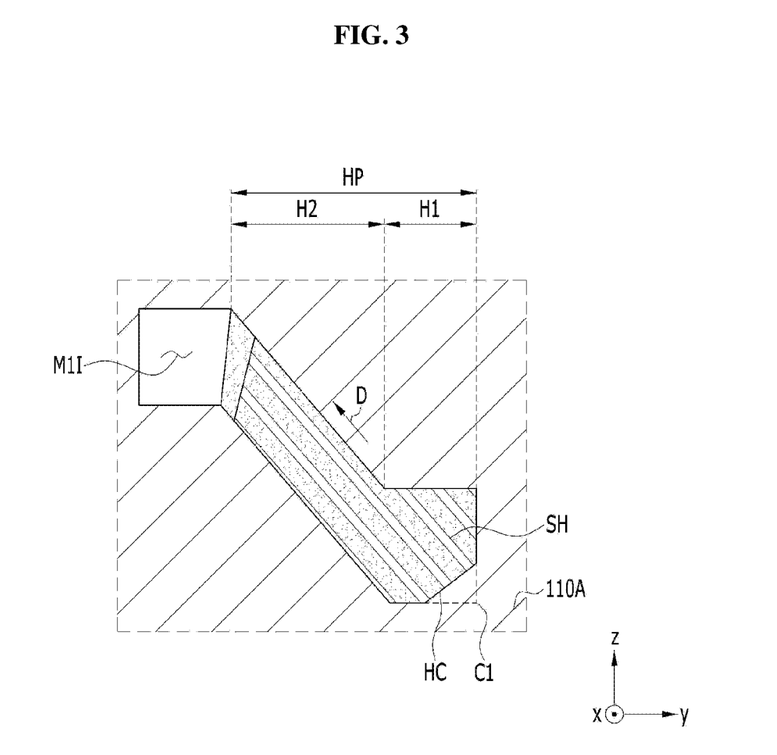
FIG. 3 is a partial front view of an embodiment of the first end plate shown in FIG. 1A.

FIG. 3 is a partial front view of an embodiment of the first end plate 110A shown in FIG. 1A.

Referring to FIG. 3, at least one of the first groove H1 or the second groove H2 may include at least one sub-groove SH. The sub-groove SH included in the second groove H2 is concavely formed between the first groove H1 and the air inlet M1I in the second direction D, in which air flows as indicated by the arrow. As shown in FIG. 3, the at least one sub-groove SH may include a plurality of sub-grooves. However, the embodiment is not limited thereto. That is, the sub-groove SH formed in the groove portion HP may be omitted.

The cover 140 covers a manifold area MA of the first end plate 110A. Referring to FIG. 1A, the manifold area MA may be defined as including an area in which the air inlet Mil, the groove portion HP, and the air outlet M1O are formed. In addition, the manifold area MA may include an area between the first groove H1 and the air outlet M1O.

Each of the first and second end plates 110A and 110B may be formed such that a metal insert is enveloped by a plastic injection-molded product. The metal insert of each of the first and second end plates 110A and 110B may have high rigidity to withstand internal surface pressure, and may be implemented by machining a metal material.

According to the embodiment, in the first end plate 110A, the air inlet M1I, the air outlet M1O, the groove portion HP, the second and third inlet manifolds M2I and M3I, and the second and third outlet manifolds M2O and M3O may be formed of resin such as plastic, and the other areas may be formed of metal.

When the cover 140 covers the manifold area MA, the cover 140 may form a flow path, through which air passes, together with the second groove H2. The cover 140 may be engaged with the first end plate 110A in any of various manners. The embodiment is not limited to any specific form of engagement between the cover 140 and the first end plate 110A. For example, as shown in FIG. 1A, a plurality of first screw holes 143 may be formed in the edge of the cover 140, a plurality of second screw holes 115 may be formed in the surface of the first end plate 110A so as to face the plurality of first screw holes 143, and the cover 140 may be engaged with the first end plate 110A by fastening bolts 145 into the first screw holes 143 and the second screw holes 115. An illustration of the bolts 145 is omitted from FIG. 1A.

Figure 4A:
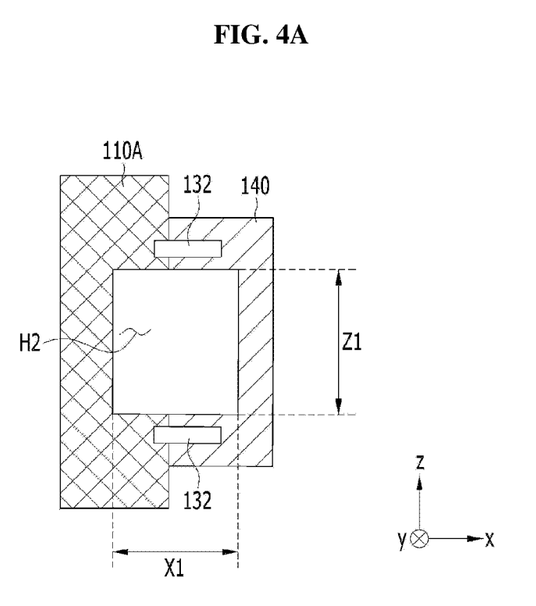
FIGS. 4A and 4B show the cross-sectional shape of an embodiment of a flow path.
Figure 4B:
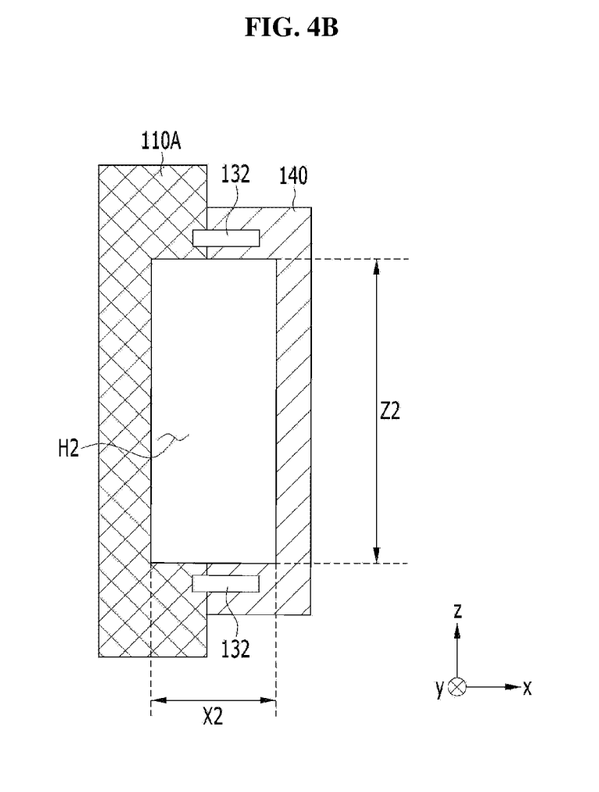

FIGS. 4A and 4B show the cross-sectional shape of an embodiment of the flow path.

According to the embodiment, the height of the flow path formed by the engagement of the cover 140 and the second groove H2 may gradually decrease in the second direction oriented from the first groove H1 toward the air inlet M1I. Further, the width of the flow path may gradually increase in the second direction D oriented from the first groove H1 toward the air inlet M1I.

For example, the portion of the flow path that is closer to the first groove H1 than to the air inlet M1I may have the cross-sectional shape shown in FIG. 4A, and the portion of the flow path that is closer to the air inlet M1I than to the first groove H1 may have the cross-sectional shape shown in FIG. 4B.

In this case, the first height X1 of the flow path shown in FIG. 4A may be greater than the second height X2 of the flow path shown in FIG. 4B, but the first width Z1 of the flow path shown in FIG. 4A may be less than the second width Z2 of the flow path shown in FIG. 4B.

Referring again to FIG. 1A, the cover 140 may include a first through-hole TH1, a second through-hole TH2, and a partition wall 142. The first through-hole TH1 communicates with the first groove H1 of the groove portion HP to form a first space through which air introduced from the outside through the valve 150 flows into the flow path. The second through-hole TH2 may communicate with the air outlet M1O to form a second space through which air is discharged to the valve 150. In this case, the partition wall 142 is disposed between the first through-hole TH1 and the second through-hole TH2, and serves to isolate the first through-hole TH1 and the second through-hole TH2 from each other.

Further, the gasket 130 may be disposed between the first end plate 110A and the cover 140, and may include first and second gaskets 132 and 134.

The first gasket 132 may be interposed between the first end plate 110A and the cover 140, and may be disposed on the edges of the air inlet Mil and the groove portion HP.

The second gasket 134 may be interposed between the first end plate 110A and the cover 140, and may be disposed on the edge of the air outlet M1O.

According to the embodiment, the first gasket 132 and the second gasket 134 may be provided separately from each other, as shown in FIG. 1A. Alternatively, the first gasket 132 and the second gasket 134 may be integrally formed with each other, unlike the configuration shown in FIG. 1A.

Figure 5:
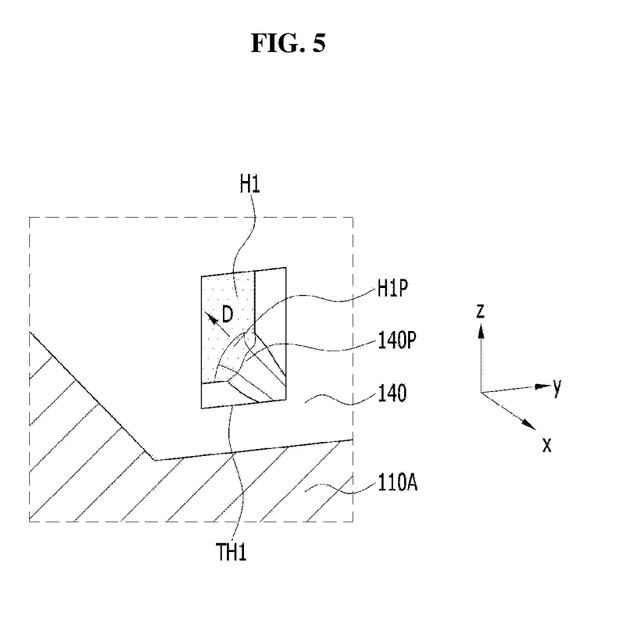
FIG. 5 is a partial perspective view of an embodiment of a first space formed by a first groove and a first through-hole in the state in which a cover is engaged with the first end plate.

FIG. 5 is a partial perspective view of an embodiment of the first space formed by the first groove H1 and the first through-hole TH1 in the state in which the cover 140 is engaged with the first end plate 110A.

The first end plate 110A may include a first protruding portion H1P, and the cover 140 may include a second protruding portion 140P.

The first protruding portion H1P may protrude in the air flow direction D from a corner C1 of the first groove H1, which is oriented opposite the air flow direction D.

The second protruding portion 140P may protrude in the air flow direction D from a corner C2 of the first through-hole TH1, which is oriented opposite the air flow direction D.

The first and second protruding portions H1P and 140P serve to guide the air introduced in the first direction such that the direction in which the air travels is changed to the second direction D.

In addition, referring to FIG. 3, in the first end plate 110A, the corner C1 of the first groove H1, which is oriented opposite the air flow direction D, may have a chamfered shape HC.

Figure 6:
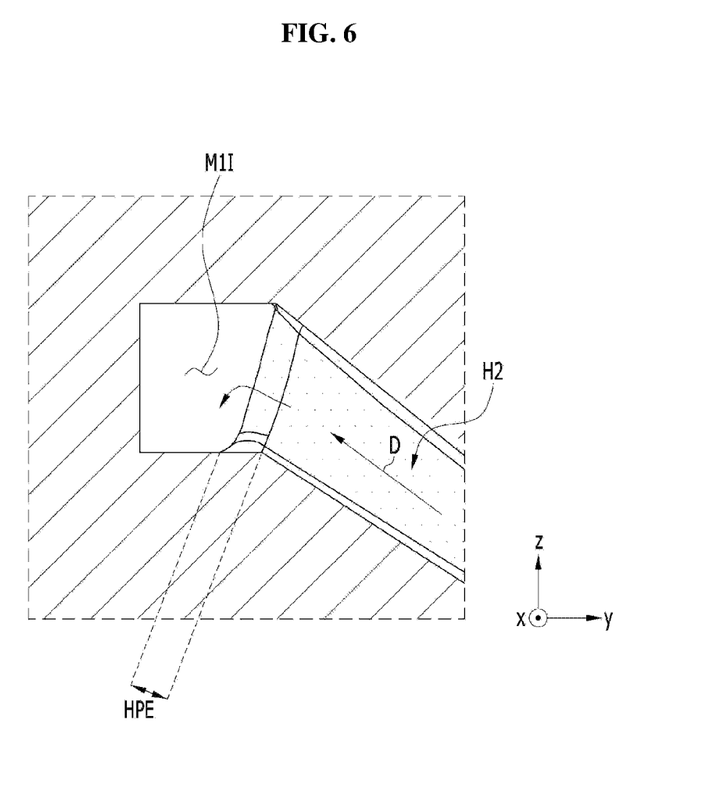
FIG. 6 is a partial front view of an embodiment of an air inlet and a second groove in the first end plate.

FIG. 6 is a partial front view of an embodiment of the air inlet MiI and the second groove H2 in the first end plate 110A.

Referring to FIG. 6, an end portion HPE of the second groove H2, which is contiguous with the air inlet M1I, may have a curvature by which the air that has travelled through the flow path in the second direction D oriented from the first groove H1 toward the air inlet MiI is guided so as to be introduced through the air inlet MiI in the first direction.

Figure 7:
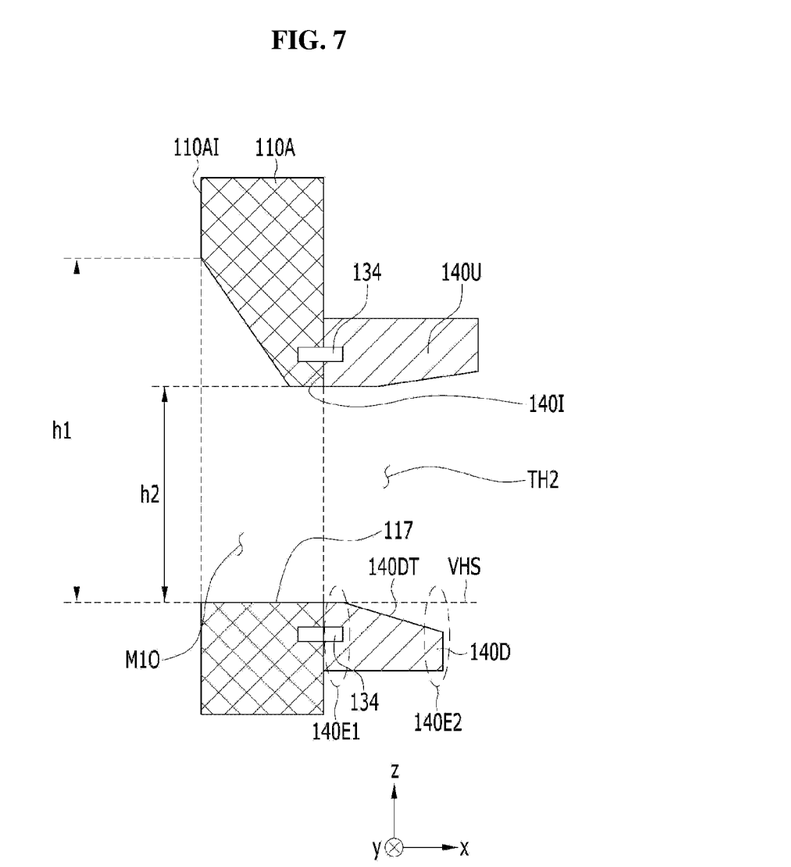
FIG. 7 is a partial coupled cross-sectional view of an embodiment of an air outlet and the cover.

FIG. 7 is a partial coupled cross-sectional view of an embodiment of the air outlet M1O and the cover 140.

According to the embodiment, the area of the air outlet M1O in the inner surface 110AI of the first end plate 110A may be greater than the area of the second through-hole TH2 in the inner surface 140I of the cover 140. For example, referring to FIG. 7, when the length of the air outlet M1O in the inner surface 110AI of the first end plate 110A in the y-axis direction is equal to the length of the second through-hole TH2 in the inner surface 140I of the cover 140 in the y-axis direction, the first height h1 of the air outlet M1O in the inner surface 110AI of the first end plate 110A may be greater than the second height h2 of the second through-hole TH2 in the inner surface 140I of the cover 140.

In addition, the cover 140 may include an upper portion 140U and a lower portion 140D. In the cross-section thereof shown in FIG. 7, the upper portion 140U is disposed on the second through-hole TH2, and the lower portion 140D is disposed under the second through-hole TH2.

According to the embodiment, the lower portion 140D of the cover 140 may have an inclined cross-sectional shape such that the height of a portion 140E2 thereof contiguous with the valve 150 is less than the height of a portion 140E1 thereof contiguous with the air outlet M1O. That is, the top surface 140DT of the lower portion 140D may be lower than a virtual horizontal surface VHS extending from the bottom surface 117 of the air outlet M1O in the first end plate 110A in the first direction.

Figure 8:
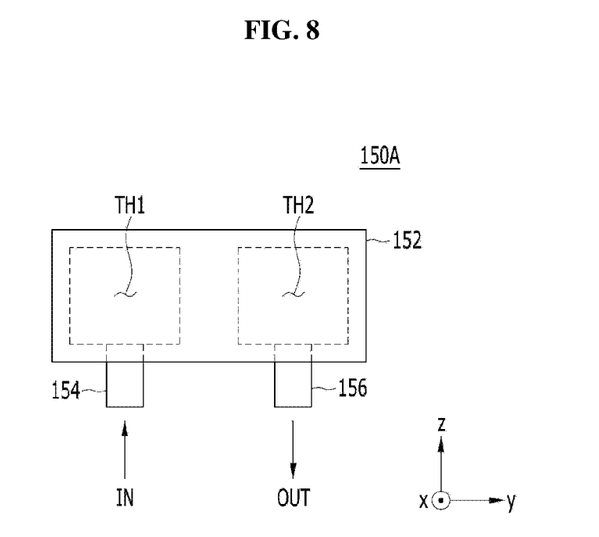
FIG. 8 is a front view of an embodiment of the valve shown in FIGS. 1A and 1B.

FIG. 8 is a front view of an embodiment of the valve 150 shown in FIGS. 1A and 1B.

Referring to FIGS. 1A, 1B and 8, the valve 150 may include an inlet portion 154 and an outlet portion 156, which are spaced apart from each other. In addition, the valve 150 may further include a body 152.

The inlet portion 154 is a portion that is connected to the first through-hole TH1 in the cover 140 such that air is introduced (IN) from the outside of the fuel cell 100 therethrough. One side of the inlet portion 154 is connected to the first through-hole TH1 inside the body 152, and the opposite side of the inlet portion 154 has a shape that protrudes from the body 152 in the direction of gravity.

The outlet portion 156 is a portion that is connected to the second through-hole TH2 in the cover 140 and is spaced apart from the inlet portion 154 such that air is discharged (OUT) to the outside of the fuel cell 100 therethrough. One side of the outlet portion 156 is connected to the second through-hole TH2 inside the body 152, and the opposite side of the outlet portion 156 has a shape that protrudes from the body 152 in the direction of gravity.

The embodiment is not limited as to the specific shape of the body 152, the inlet portion 154 or the outlet portion 156, so long as the inlet portion 154 is capable of supplying air introduced from the outside of the fuel cell 100 in a direction IN to the first through-hole TH1 and the outlet portion 156 is capable of discharging air and/or condensate water flowing out of the second through-hole TH2 to the outside in a direction OUT.

Further, the valve 150 may simultaneously open or simultaneously close the inlet portion 154 and the outlet portion 156. For example, the inlet portion 154 and the outlet portion 156 of the valve 150 may be simultaneously opened or simultaneously closed by the operation of a motor (not shown), but the embodiment is not limited thereto. That is, the valve 150 may simultaneously open or simultaneously close the inlet portion 154 and the outlet portion 156 in various manners.

To this end, the fuel cell 100 may further include a controller (not shown). When a vehicle equipped with the fuel cell 100 is turned off or is not driven for a long period of time, the controller may generate a control signal to drive the motor such that the inlet portion 154 and the outlet portion 156 are simultaneously closed. Alternatively, when a vehicle equipped with the fuel cell 100 is turned on to be driven, the controller may generate a control signal to drive the motor such that the inlet portion 154 and the outlet portion 156 are simultaneously opened.

Figure 9A:
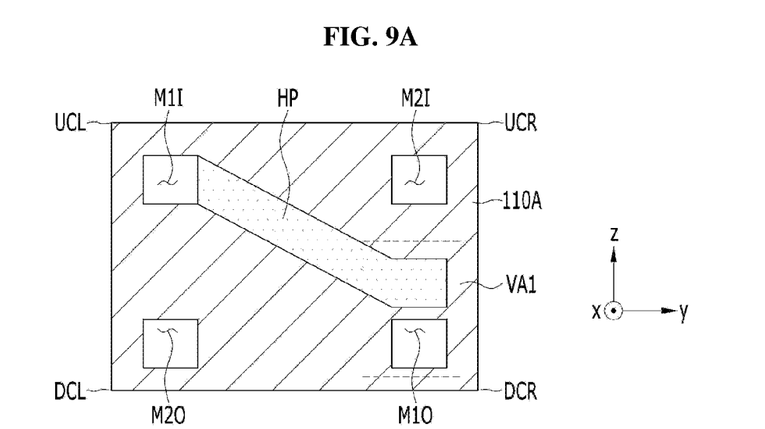
FIGS. 9A and 9B are front views of the first end plate according to the embodiment.
Figure 9B:
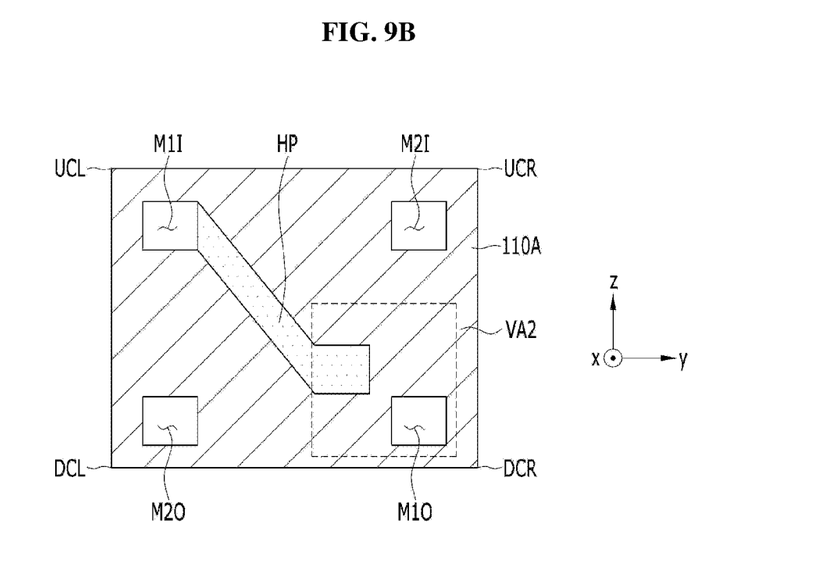

FIGS. 9A and 9B are front views of the first end plate 110A according to an embodiment. For convenience of description, an illustration of the gasket 130, the cover 140 and the valve 150 is omitted from FIGS. 9A and 9B.

According to the embodiment, the first end plate 110A may include a valve area VA. Here, the valve area VA may be defined as an area in the first end plate 110A that overlaps the valve 150 in the first direction, in which the unit cells 122 are stacked.

The valve area VA may be located inside the lower-left corner DCL or the lower-right corner DCR of the first end plate 110A, and the air inlet M1I may be located inside the upper-right corner UCR or the upper-left corner UCL of the first end plate 110A. For example, as illustrated in FIGS. 9A and 9B, when the air inlet M1I is located inside the upper-left corner UCL of the first end plate 110A, the valve area VA may be located inside the lower-right corner DCR of the first end plate 110A. In this way, the air inlet M1I and the valve area VA may be disposed opposite each other in a diagonal direction.

Further, the first and second through-holes TH1 and TH2 may overlap the valve area VA in the first direction. Accordingly, the first groove H1 communicating with the first through-hole TH1 and the air outlet M1O communicating with the second through-hole TH2 may be located within the valve area VA.

According to the embodiment, as shown in FIGS. 9A and 9B, the first groove H1 may be disposed above the air outlet M1O within the valve area VA (VA1 or VA2). In this case, as shown in FIG. 9A, the first groove H1 may be disposed directly above the air outlet M1O within the valve area VA1. Alternatively, as shown in FIG. 9B, the first groove H1 may be disposed beside the point directly above the air outlet M1O within the valve area VA2.

The operation of the fuel cell 100 having the above-described configuration, which receives air from the outside or discharges air to the outside, will be described below.

First, an operation in which air is suppled from the outside to the fuel cell 100 according to the embodiment will be described.

The motor is driven under the control of the controller to open the inlet portion 154 and the outlet portion 156 of the valve 150. In this case, the inlet portion 154 and the outlet portion 156 may be simultaneously opened.

Thereafter, the air introduced into the valve 150 through the inlet portion 154 in the direction IN enters the first space formed by the first through-hole TH1 in the cover 140 and the first groove H1. Thereafter, the air entering the first space flows in the second direction through the flow path formed by the second groove H2 and the cover 140, and is then supplied to the inside of the cell stack 122 through the air inlet M1I.

Next, an operation in which air is discharged to the outside from the fuel cell 100 according to the embodiment will be described.

The air discharged from the inside of the cell stack 122 through the air outlet M1O passes through the second through-hole TH2, and then escapes to the outside through the outlet portion 156 of the valve 150 in the direction OUT.

Consequently, when the valve 150 is opened, air is allowed to circulate through the fuel cell 100, and when the valve 150 is closed, air is prevented from circulating through the fuel cell 100.

Hereinafter, a comparison between a fuel cell according to a comparative example and the fuel cell according to an embodiment will be described below.

When a vehicle equipped with a fuel cell is turned off or a fuel cell is not used for a long period of time, if the cell stack is not sealed, the performance of the cell stack may be deteriorated, and the clamping force may decrease. This is caused by exposure of the cell stack to air. Described in detail, when an appropriate amount of moisture is present on the electrode surface of the MEA 210, which is a path through which hydrogen ions move, hydrogen ions move smoothly. However, if an appropriate amount of moisture is not present on the cell stack, the rigidity of the GDLs 222 and 224 is not maintained, clamping force decreases, and cell contact resistance increases. Therefore, when the cell stack is not used or is left undriven for a long period of time, it is required to close the air inlet M1I and the air outlet M1O in order to seal the cell stack so that the cell stack is not exposed to air.

In the case of the comparative example, when the fuel cell is not used for a long period of time, a first air cut-off valve (ACV) for closing the air inlet M1I and a second air cut-off valve for closing the air outlet M1O are mounted separately to the end plate 110A. In this case, since the air inlet M1I and the air outlet M1O are spaced apart from each other in a diagonal direction, the first air cut-off valve and the second air cut-off valve are coupled to the end plate in the state of being provided separately from each other. As such, because the fuel cell according to the comparative example requires two air cut-off valves, the number of components thereof increases, and the manufacturing cost thereof increases.

On the other hand, in the fuel cell 100 according to an embodiment, after the groove portion HP is formed in the first end plate 110A, the cover 140 is engaged with the first end plate 110A to form a flow path through which air flows. The first groove H1 is disposed near the air outlet M1O. In this case, both the first hole H1 and the air outlet M1O are disposed within the valve area VA (VA1 or VA2), which overlaps the valve 150 in the first direction. Therefore, even though the air inlet M1I and the air outlet M1O are spaced apart from each other in a diagonal direction, it is possible to simultaneously open or simultaneously close the inlet portion 154 and the outlet portion 156 using only one valve 150. Accordingly, compared to the fuel cell according to the comparative example, the fuel cell 100 according to an embodiment in which only one valve is used includes a reduced number of components and is capable of being manufactured at low cost.

Further, the portion of the first end plate 110A, other than the inlet and outlet manifolds M1I to M3I and M1O to M3O and the groove portion HP may be made of metal so as to secure a sufficient amount of rigidity of the first end plate 110A. Accordingly, for example, it is possible to enhance the clamping force with which the cell stack 122 is clamped using the first end plate 110A. In this case, each of the inlet and outlet manifolds M1I to M3I and M1O to M3O and the groove portion HP in the first end plate 110A may be made of an insulating and corrosion-resistant material such as plastic so as to prevent the first end plate 110A from being corroded by water discharged through the air outlet M1O.

Further, although the first space, which is formed by the first through-hole TH1 in the cover 140 and the first groove H1 and into which air is introduced, and the second space, which is formed by the air outlet M1O and the second through-hole TH2 in the cover 140 and through which air is discharged, are adjacent to each other, the first space and the second space may be securely isolated from each other by the first gasket 132 and the second gasket 134. Accordingly, the first space and the second space may be formed adjacent to each other.

Further, although not shown, a third gasket (not shown) may be additionally disposed at an engagement portion between the valve 150 and the cover 140. Accordingly, since the cell stack 122 is capable of being sealed from external air by the first and second gaskets 132 and 134 and the third gasket, it is possible to maintain the performance of the cell stack and to prevent deterioration in clamping force when a vehicle equipped with the fuel cell 100 is turned off or the fuel cell 100 is not used for a long period of time.

Further, as shown in FIGS. 1A, 1B and 8, since the outlet portion 156 protrudes from the valve 150 in the direction of gravity, condensate water may be more smoothly discharged through the air outlet M1O.

Further, as shown in FIG. 7, since the lower portion 140D of the cover 140 has an inclined cross-sectional shape such that the height of the portion 140E2 thereof that is contiguous with the valve 150 is less than the height of the portion 140E1 thereof that is contiguous with the air outlet M1O, condensate water may be more smoothly discharged through the air outlet M1O.

Further, as shown in FIGS. 4A and 4B, since the widths Z1 and Z2 and the heights X1 and X2 of the flow path vary in the second direction, oriented from the first groove H1 toward the air inlet M1I, differential pressure in the flow path may be minimized.

Further, as shown in FIG. 5, since the first and second protruding portions H1P and 140P are formed so as to guide air introduced into the first space toward the flow path, it is possible to minimize swirl of the air introduced into the first space.

Further, as shown in FIG. 6, since the end portion HPE of the second groove H2, which is contiguous with the air inlet M1I, has a curvature by which the air that has travelled through the flow path in the second direction is guided in the first direction oriented toward the air inlet M1I, it is possible to minimize swirl of the air introduced into the air inlet M1I.

Further, as shown in FIG. 7, since the area of the air outlet M1O in the inner surface 110AI of the first end plate 110A is greater than the area of the second through-hole TH2 in the inner surface 140I of the cover 140, it is possible to reduce the influence of differential pressure on the cell stack 122 in which the reaction is completed.

Further, as shown in FIG. 3, when the sub-groove SH is formed in the flow path, air may more smoothly flow through the flow path, and thus air introduced into the first space may easily move toward the air inlet Mil.

As is apparent from the above description, a fuel cell according to the embodiments includes a reduced number of components and is capable of being manufactured at relatively low cost. In addition, the fuel cell according to the embodiments is capable of preventing corrosion of a first end plate, maintaining the performance of a cell stack, preventing deterioration in clamping force, improving discharge of condensate water, minimizing differential pressure in a flow path, minimizing swirl of air introduced into a first space and air introduced into an air inlet, reducing the influence of differential pressure, and enabling air introduced into the first space to easily move toward the air inlet.

However, the effects achievable through the disclosure are not limited to the above-mentioned effects, and other effects not mentioned herein will be clearly understood by those skilled in the art from the above description.

The above-described various embodiments may be combined with each other without departing from the objects of the present disclosure unless they are contrary to each other. In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell, comprising:
   a cell stack configured such that a plurality of unit cells is stacked;
   an end plate disposed at one of two ends of the cell stack, the end plate comprising an air inlet, an air outlet, and a groove portion comprising a first groove adjacent to and spaced apart from the air outlet and a second groove connecting the first groove to the air inlet; and
   a cover covering a region of the end plate in which the air inlet, the groove portion and the air outlet are formed so as to form a flow path together with the second groove to allow air to pass therethrough, the cover comprising a first through-hole communicating with the first groove, a second through-hole communicating with the air outlet, and a partition wall isolating the first through-hole and the second through-hole from each other.

2. The fuel cell according to claim 1, further comprising a valve comprising an inlet portion connected to the first through-hole and an outlet portion connected to the second through-hole and isolated from the inlet portion, wherein the valve is configured to simultaneously open or simultaneously close the inlet portion and the outlet portion.

3. The fuel cell according to claim 2, wherein:
   the end plate comprises a valve area overlapping the valve in a first direction in which the plurality of unit cells is stacked;
   the first through-hole and the second through-hole overlap the valve area in the first direction; and
   the first groove and the air outlet are located within the valve area.

4. The fuel cell according to claim 3, wherein the first groove is disposed above the air outlet within the valve area.

5. The fuel cell according to claim 4, wherein the first groove is disposed beside a point above the air outlet within the valve area.

6. The fuel cell according to claim 3, wherein an end portion of the second groove that is contiguous with the air inlet has a curvature by which air, having travelled through the flow path in a second direction oriented from the first groove toward the air inlet, is guided so as to travel in the first direction through the air inlet.

7. The fuel cell according to claim 2, further comprising a first gasket interposed between the end plate and the cover and disposed on edges of the air inlet and the groove portion.

8. The fuel cell according to claim 7, further comprising a second gasket interposed between the end plate and the cover and disposed on an edge of the air outlet.

9. The fuel cell according to claim 8, wherein the first gasket and the second gasket are provided separately from each other.

10. The fuel cell according to claim 8, wherein the first gasket and the second gasket are integrally formed with each other.

11. The fuel cell according to claim 2, wherein:
    the flow path has a predetermined height and a predetermined width;
    the height gradually decreases from the first groove to the air inlet; and
    the width gradually increases from the first groove to the air inlet.

12. The fuel cell according to claim 2, wherein the second groove comprises at least one sub-groove concavely formed between the first groove and the air inlet in a direction in which air flows.

13. The fuel cell according to claim 2, wherein an area of the air outlet in an inner surface of the end plate is greater than an area of the second through-hole in an inner surface of the cover.

14. The fuel cell according to claim 2, wherein a height of the air outlet in an inner surface of the end plate is greater than a height of the second through-hole in an inner surface of the cover.

15. A fuel cell, comprising:
    a cell stack configured such that a plurality of unit cells is stacked;
    an end plate disposed at one of two ends of the cell stack, the end plate comprising:
       an air inlet located inside an upper-right corner or an upper-left corner of the end plate;
       an air outlet; and
       a groove portion comprising a first groove adjacent to and spaced apart from the air outlet and a second groove connecting the first groove to the air inlet;
    a cover configured to cover a region of the end plate in which the air inlet, the groove portion and the air outlet are formed so as to form a flow path together with the second groove to allow air to pass therethrough, the cover comprising:
       a first through-hole communicating with the first groove; a second through-hole communicating with the air outlet; and
       a partition wall isolating the first through-hole and the second through-hole from each other; and
    a valve comprising an inlet portion connected to the first through-hole and an outlet portion connected to the second through-hole and isolated from the inlet portion;
    wherein the valve is configured to simultaneously open or simultaneously close the inlet portion and the outlet portion;

wherein the end plate comprises a valve area overlapping the valve in a first direction in which the plurality of unit cells is stacked, the valve area located inside a lower-left corner or a lower-right corner of the end plate;

wherein the first through-hole and the second through-hole overlap the valve area in the first direction; and wherein the first groove and the air outlet are located within the valve area.

16. The fuel cell according to claim 15, wherein:

the end plate comprises a first protruding portion protruding in an air flow direction from a corner of the first groove that is oriented opposite the air flow direction;

the cover comprises a second protruding portion protruding in the air flow direction from a corner of the first through-hole that is oriented opposite the air flow direction; and the first protruding portion and the second protruding portion are configured to guide air introduced in the first direction such that a direction in which the air travels is changed to the air flow direction.

17. The fuel cell according to claim 15, wherein, in the end plate, a corner of the first groove that is oriented opposite an air flow direction has a chamfered shape.

18. A fuel cell, comprising:

a cell stack configured such that a plurality of unit cells is stacked;

an end plate disposed at one of two ends of the cell stack, the end plate comprising:

an air inlet;

an air outlet; and a groove portion comprising a first groove adjacent to and spaced apart from the air outlet and a second groove connecting the first groove to the air inlet;

a cover configured to cover a region of the end plate in which the air inlet, the groove portion and the air outlet are formed so as to form a flow path together with the second groove to allow air to pass therethrough, the cover comprising:

a first through-hole communicating with the first groove;

a second through-hole communicating with the air outlet;

a partition wall isolating the first through-hole and the second through-hole from each other;

an upper portion disposed on the second through-hole; and a lower portion disposed under the second through-hole; and a valve comprising an inlet portion connected to the first through-hole and an outlet portion connected to the second through-hole and isolated from the inlet portion;

wherein the valve is configured to simultaneously open or simultaneously close the inlet portion and the outlet portion; and wherein the lower portion of the cover has an inclined cross-sectional shape such that a height of a portion thereof contiguous with the valve is less than a height of a portion thereof contiguous with the air outlet.

19. The fuel cell according to claim 18, wherein the groove portion of the end plate is formed of resin.

* * * * *